(12) United States Patent
Wang

(10) Patent No.: US 8,497,665 B2
(45) Date of Patent: Jul. 30, 2013

(54) DROP POWER SUPPLY CIRCUIT

(75) Inventor: Zhong Mei Wang, Chaiwan (HK)

(73) Assignee: Simatelex Manufactory Co. Ltd., Chaiwan (HK)

( * ) Notice: Subject to any disclaimer, the term of this patent is extended or adjusted under 35 U.S.C. 154(b) by 279 days.

(21) Appl. No.: 12/826,883

(22) Filed: Jun. 30, 2010

(65) Prior Publication Data
US 2012/0001607 A1     Jan. 5, 2012

(51) Int. Cl.
*G05F 1/10* (2006.01)

(52) U.S. Cl.
USPC ............................ 323/238; 323/288; 323/901

(58) Field of Classification Search
USPC ............................ 323/908, 901, 231, 238, 288
See application file for complete search history.

(56) References Cited

U.S. PATENT DOCUMENTS

| | | | | |
|---|---|---|---|---|
| 5,187,653 A | * | 2/1993 | Lorenz | 363/89 |
| 5,374,887 A | * | 12/1994 | Drobnik | 323/299 |
| 5,381,295 A | * | 1/1995 | Rund et al. | 361/92 |
| 6,703,889 B2 | * | 3/2004 | Dodson, III | 327/434 |
| 6,717,784 B2 | * | 4/2004 | Isago et al. | 361/58 |

* cited by examiner

*Primary Examiner* — Jessica Han
(74) *Attorney, Agent, or Firm* — Leydig, Voit & Mayer, Ltd.

(57) ABSTRACT

A capacitor drop power supply circuit for supplying power to a load has a switch configured to alter a configuration of the power supply circuit to reduce input current of the power supply circuit. The switch is operable by the load to alter the configuration when the load enters a power save mode. The switch is operable to alter the configuration of the power supply circuit between a first configuration having a first current path through the power supply circuit in a first current direction, and a second configuration having a second current path through the power supply circuit in the first current direction. The switch changes the power supply circuit between the first configuration and the second configuration when the load enters a power save mode.

15 Claims, 10 Drawing Sheets

DROP POWER SUPPLY CIRCUIT

FIELD OF THE INVENTION

The present invention relates to a drop type power supply circuit for converting AC power supply to a DC power supply.

BACKGROUND TO THE INVENTION

Capacitor drop type power supply circuits are commonly used in domestic appliances for converting AC mains power to DC supply for the appliance. The AC mains supply may first have its voltage lowered by a transformer. FIG. 1 illustrates a typical example of a capacitor drop power supply circuit. The circuit comprises a first capacitor 4A, a resistor 3A and a diode 5A. A zener diode 7A is provided as a voltage reference. A second capacitor 9A in series with a diode 8A is located in parallel with the zener diode 7A. During a positive half cycle of the input voltage current flows in the direction I+ through the load and to charge up second capacitor 9A. During the negative half cycle current flows in the opposite direction I− through the resistor 3A, capacitor 4A and diode 5A. A load current IL is supplied via discharge of second capacitor 9A.

The input impedance of this power supply circuit is mainly dependent upon the value of the drop capacitor 4A and does not change greatly regardless of the load on the power supply. In the case a domestic appliance's load varies between normal operation mode and standby mode. Many appliances are not turned off and spend most of their time in standby mode when the actual current draw of the device is very low. However, because the input impedance of the power supply circuit is mainly dictated by capacitor 4A, the power drawn by the power supply is relatively constant regardless of whether the appliance is in normal operation mode or standby mode.

SUMMARY OF THE INVENTION

It is an object of the current invention to provide a capacitor drop tye power supply circuit which overcomes or at least ameliorates the above-mentioned problems with the prior art.

In a first aspect the invention provides a capacitor drop power supply circuit for supplying a load. The circuit comprises a switch configured to alter a configuration of the circuit so as to reduce input current of the power supply and is operable by the load to alter a configuration of the circuit when the load enters a power save mode. The switch can be a relay or a transistor.

The circuit may comprise a first capacitor drop circuit and a second capacitor drop circuit in parallel with the first drop circuit, with the switch connected to the second drop circuit. The switch has a first position in which the second drop circuit is commented to the load and a second position in which the second drop circuit is not connected to the load.

The circuit may comprise a first capacitor drop circuit and a second capacitor drop circuit with the switch having a first position in which the first and second drop capacitor circuit are connected in series and a second position in which the first and second drop circuits are connected in parallel.

The circuit may comprise a resistor connected in series with the switch, with the resistor and switch connected in parallel with the load. The resistor has an impedance higher than the load.

In a first aspect the invention provides a capacitor drop power supply circuit for supplying power to a load in which the circuit has an input for receiving an alternating input current having a first part-cycle in which current flows in a first direction and a second part-cycle in which current flows in a second direction. The circuit also has a switch operable to alter configuration of the power supply circuit between a first configuration having a first current path through the power supply circuit in the first direction and a second configuration having a second current path through the power supply circuit in the first direction. The switch is operable by the load to change the power supply circuit between the first configuration and the second configuration when the load enters a power save mode. The switch is a relay or a transistor.

The circuit may comprise a first drop circuit and a second drop circuit in parallel with the first drop circuit, with the switch connected with the second drop circuit and having a first position in which the second drop circuit is connected with the load and a second position in which the second drop circuit is not connected with the load.

The circuit may comprise a pair of circuit components, with the switch having a first position in which the pair of circuit components is connected in series and a second position in which the pair of circuit components is connected in parallel. The pair of circuit components are a pair of capacitors.

The circuit may comprise a resistor connected in series with the switch and with the resistor and switch connected in parallel with an output of the power supply. The resistor has impedance higher than the load.

Further aspects of the invention will become evident from the following description which is given by way of example only.

BRIEF DESCRIPTION OF THE DRAWINGS

The invention will now be described with reference to the accompanying drawings in which.

DETAILED DESCRIPTION OF THE PREFERRED EMBODIMENTS

Figure 1:
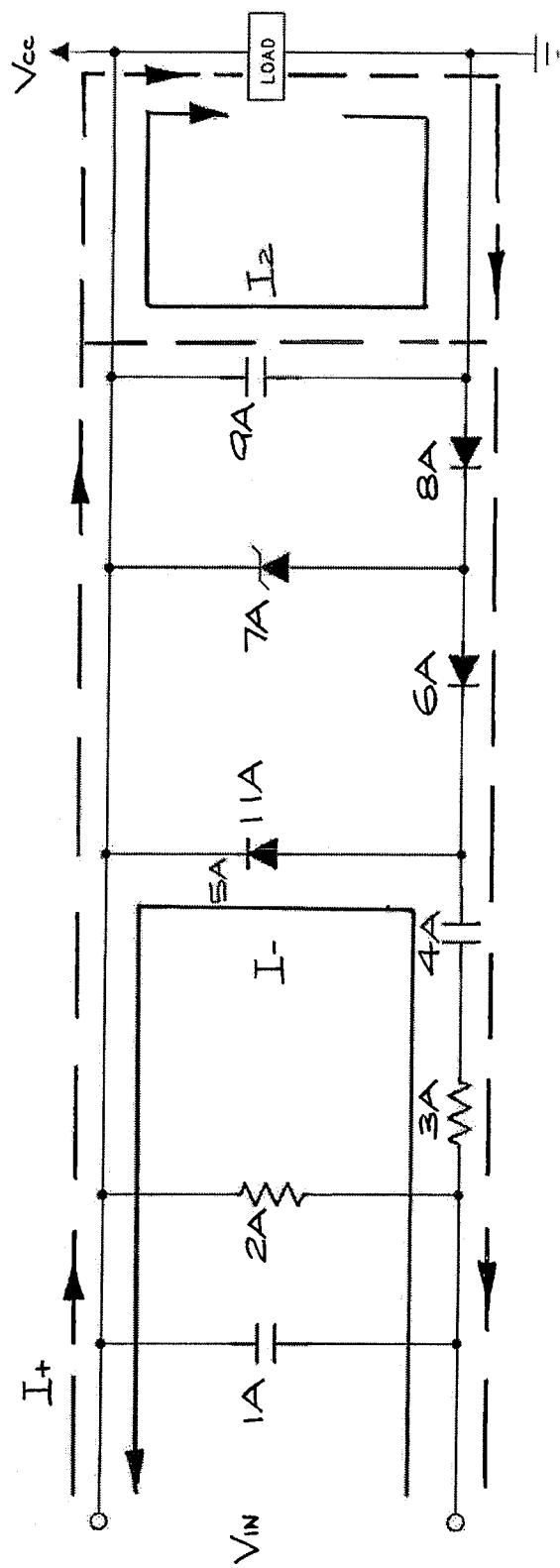
FIG. 1 is a circuit diagram of a drop type power supply circuit as known hitherto.

The following description is given by way of example only to illustrate the invention and is not intended to limit the scope of use or functionality of the invention. It is to be understood that the invention is not limited in its application to the details of construction or the arrangement of components set forth from the following description or illustrated in the drawings. The invention is capable of other embodiments and of being practiced or being carried out in various ways. Further, the phraseology and terminology used is for the purpose of description only and should not be regarded as limiting the scope of use or functionality of the invention.

The invention provides for a power supply circuit which in a normal mode operates as a conventional capacitor drop type power supply, but which includes additional circuit elements and a switch for reconfigurating the circuit arrangement during a standby mode of the power supply load so as to limit current flow in the power supply circuit to save energy during standby mode. The current in the power supply circuit can be limited during standby mode by several means including, but not limited to, limiting current flow through the load during standby mode, limiting input current flow through the "drop" capacitor and/or changing the apparent input impedance of the power supply. The invention includes the addition of a switch which could be in the form of a relay or a solid state type switch such as a transistor. The switch is controlled by a control circuit or a controller of the appliance which forms the load of the power supply and is activated when the appliance enters standby mode. Activating the switch and standby mode reconfigures the power supply so as to limit current flow through the power supply.

Figure 2:
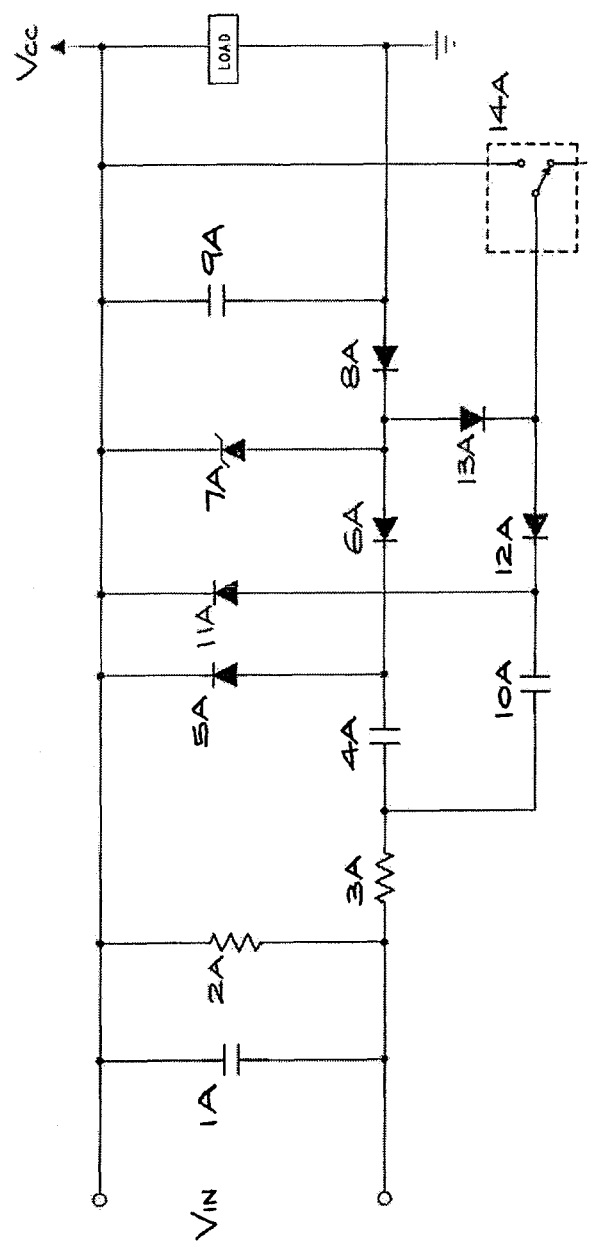
FIG. 2 is a circuit diagram of a capacitor drop type power supply according to a first aspect of the invention.
Figure 3:
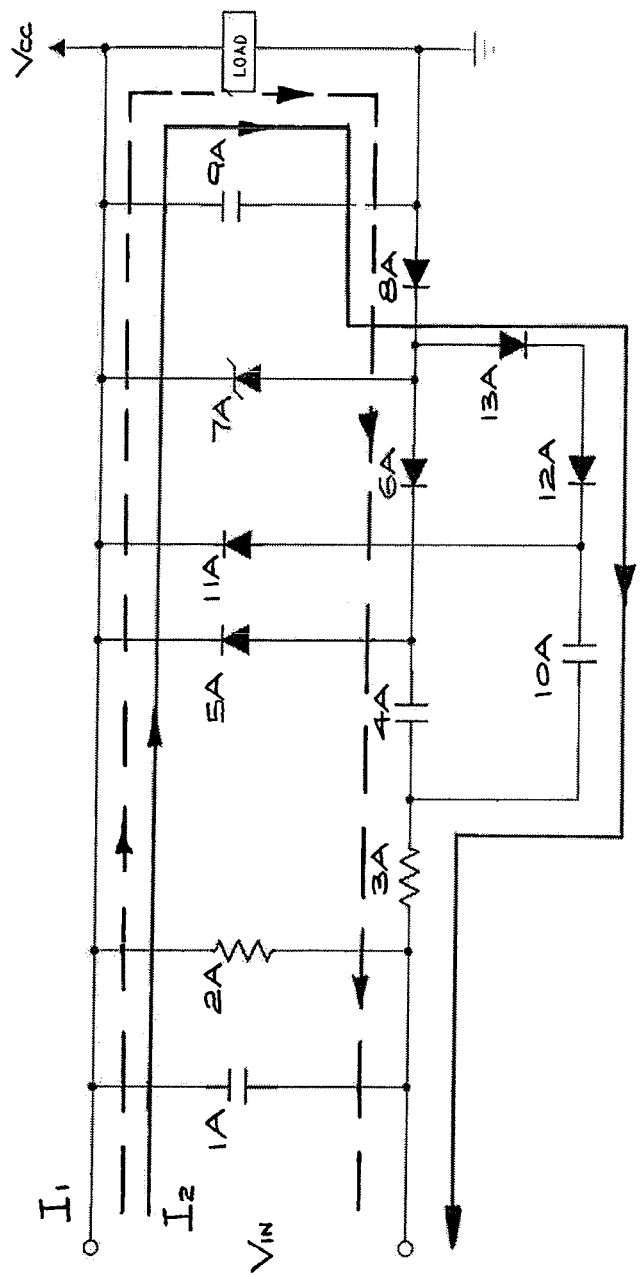
FIG. 3 is an illustrative circuit diagram of the FIG. 2 circuit in a normal operation mode.
Figure 4:
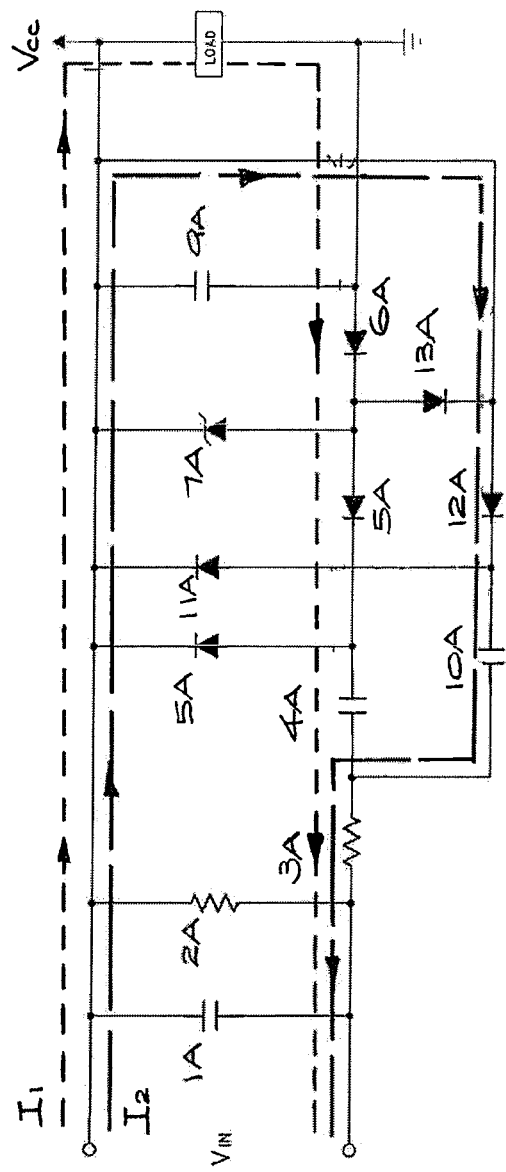
FIG. 4 is an illustrative circuit diagram of the FIG. 2 circuit in a power save mode.

Referring to FIGS. 2, 3 and 4, in a first particular embodiment of the invention a conventional capacitor drop type power supply such as that shown in FIG. 1 has additionally included a second drop capacitor 10A and diode 11A connected in parallel with first drop capacitor 4A and its diode 5A. A switch 14A connects the second capacitor 10A to the positive supply rail. A diode 13A connects the capacitor to the negative supply rail. The switch 14A is controlled by the controller of the appliance and is open when the appliance is in normal operation mode and is closed when the appliance enters standby mode. FIG. 3 illustrates the equivalent circuit of FIG. 2 when the appliance is in normal operation mode and the switch is open. During a positive half cycle of the input supply voltage Vin two current paths exist through the load. The first current path I1 (shown in dash lines) passes through the load and back through capacitor 4A and resistor 3A. The second path I2 (shown in solid line) passes through the load and through second capacitor 10A and resistor 3A. The load current is the sum of currents I1 and I2 which both flow in the load. FIG. 4 illustrates the equivalent circuit for standby mode when the switch is closed. In this arrangement the second current path I2 bypasses the load thereby reducing the load current in standby mode.

Figure 5:
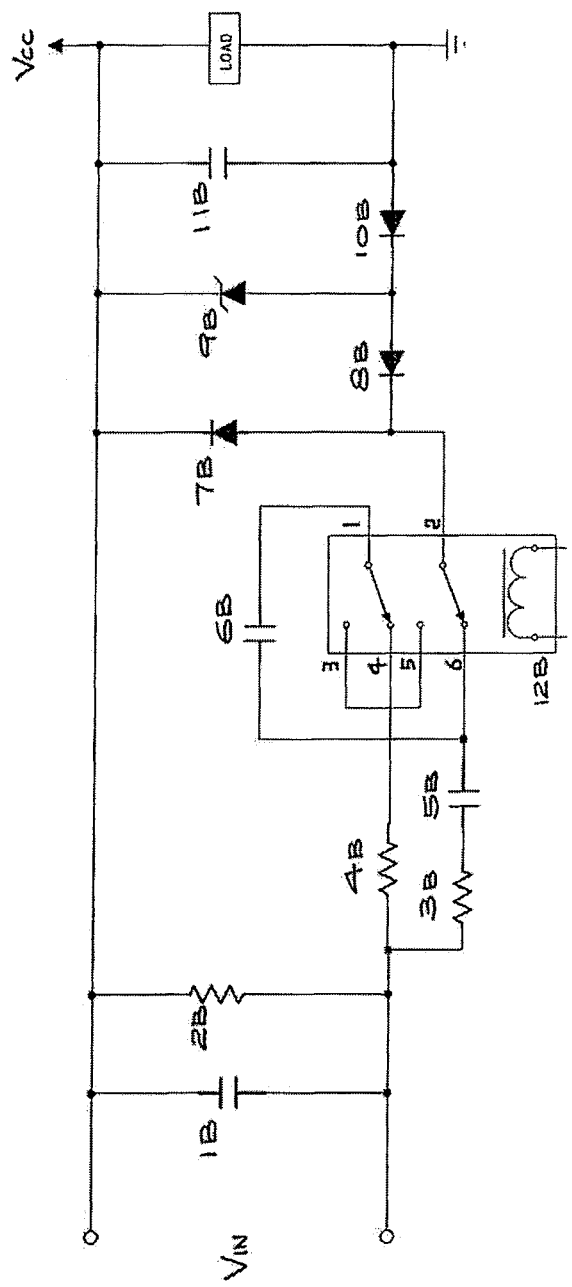
FIG. 5 is a circuit diagram of a capacitor drop type power supply according to a second embodiment of the invention.
Figure 6:
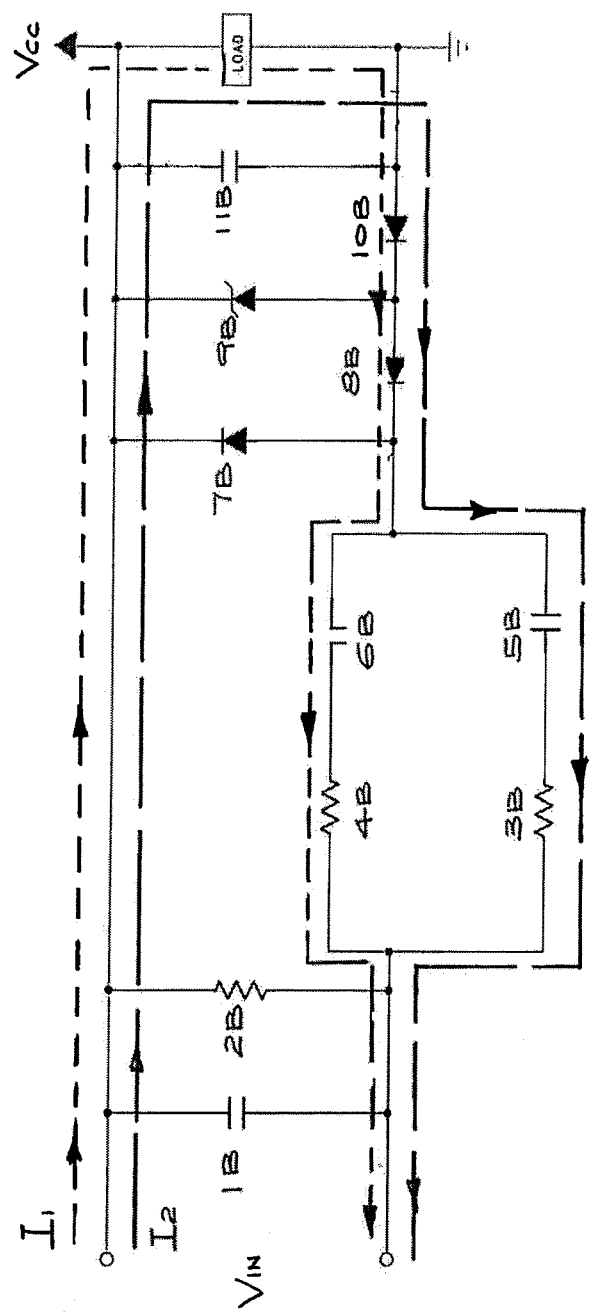
FIG. 6 is an illustrative circuit diagram of the FIG. 5 circuit in a normal power mode.
Figure 7:
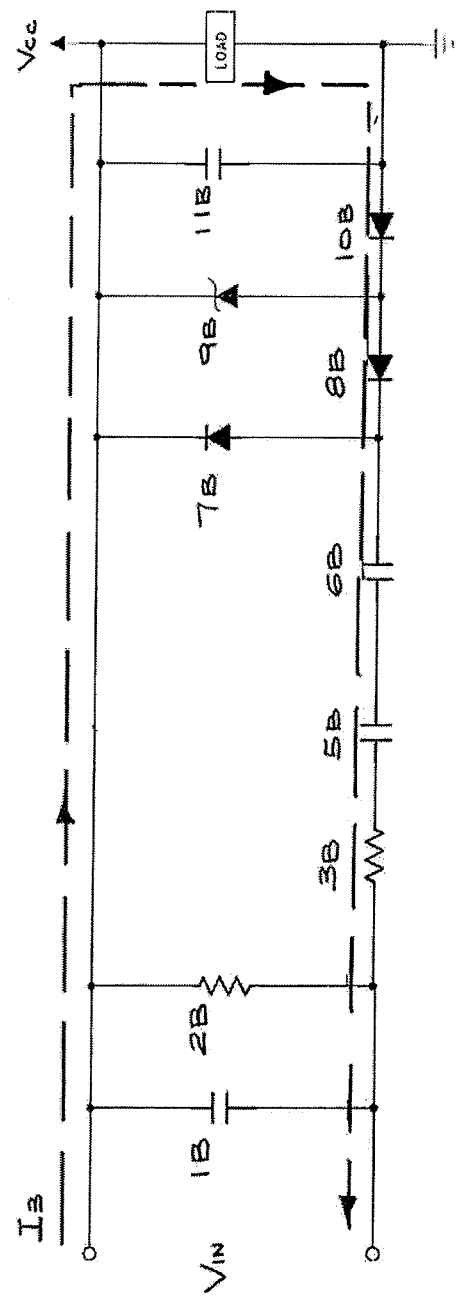
FIG. 7 is an illustrative circuit diagram of the FIG. 5 circuit in a power save mode.

FIG. 5 shows an alternative embodiment of a circuit according to the invention in which the standard capacitor drop power supply circuit of FIG. 1 is alternated with a second capacitor 5B and resistor 3B and a switch 12A which can configure the two capacitors 5B and 6B in series or in parallel. FIG. 6 is an illustrative circuit diagram of the power supply in normal power mode with the double pole switch connecting terminals 1-4 and 2-6. During a positive half cycle of the input voltage there are two current paths around the circuit. The first current path I1 flows through the load and through capacitor 6B and resistor 4B. The second current path I2 flows through the load and through capacitor 5B and resistor 3B. When the appliance goes into standby mode switch 12B is thrown to connect terminals 1-3 and 2-5. This connects the two capacitors 6B and 5B in series with resistor 3B as shown in the illustrative circuit of FIG. 7. The impedance of the series circuit of FIG. 7 is higher than the apparent impedance of FIG. 6 and so power consumption in standby mode of FIG. 7 is lower.

Figure 8:
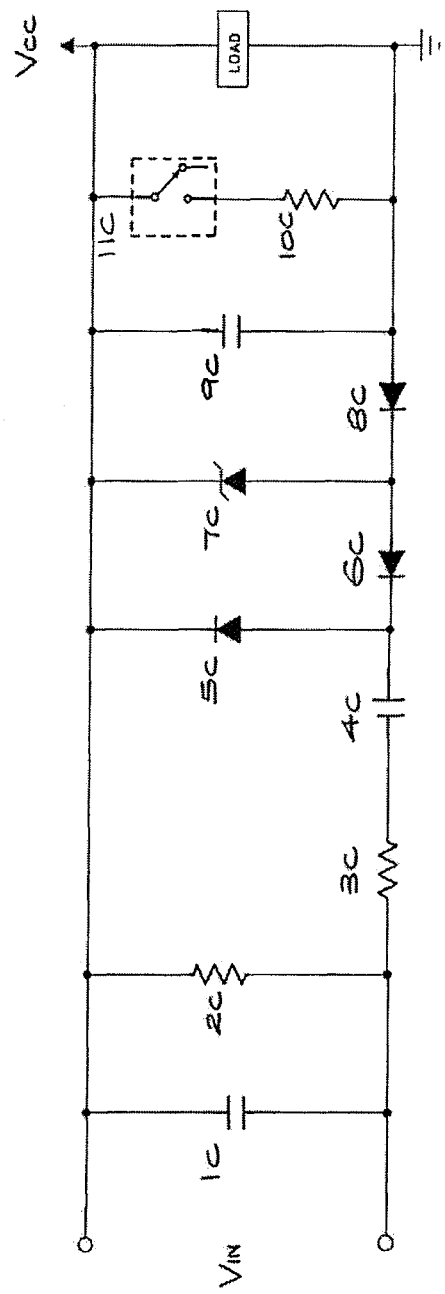
FIG. 8 is a circuit diagram of a capacitor drop type power supply according to a third embodiment of the invention.
Figure 9:
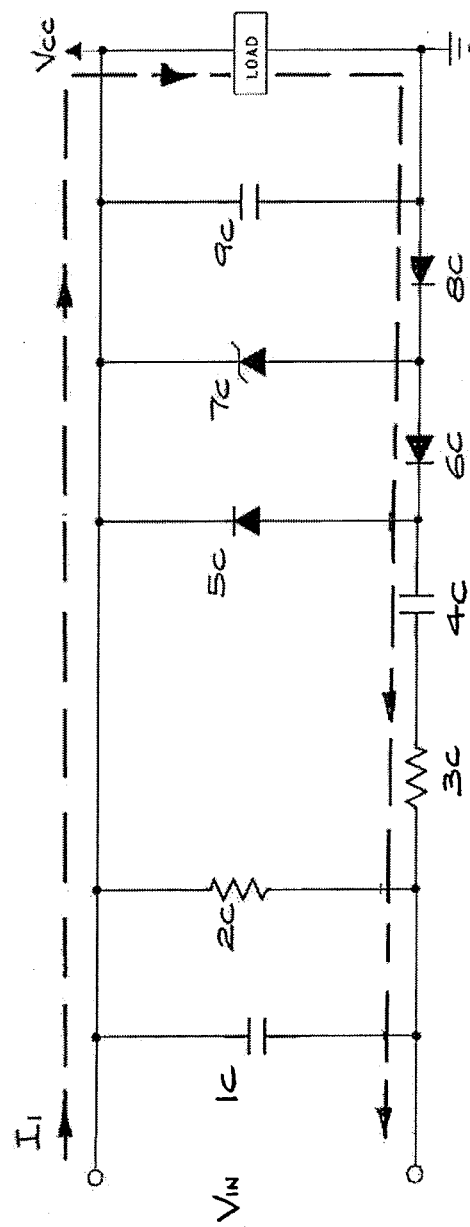
FIG. 9 is an illustrative circuit diagram of the FIG. 8 circuit in a normal power mode.
Figure 10:
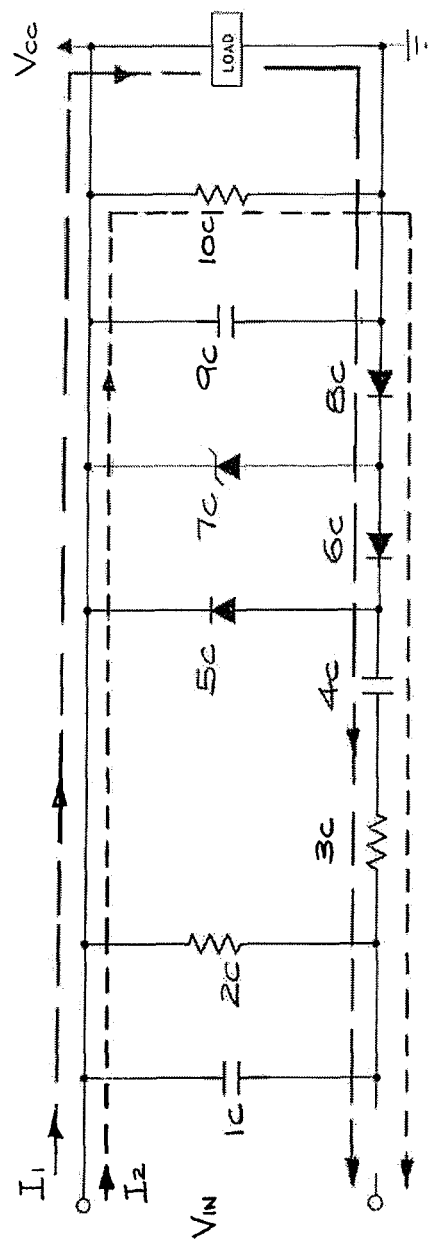
FIG. 10 is an illustrative circuit diagram of the FIG. 8 circuit in a power save mode.

FIG. 8 illustrates a further embodiment of the invention whereby the typical capacitor drop power supply circuit is alternated by the replacement of a switch 11c and series resistor 10c in parallel with the output capacitor 9c. The resistor 10c has an impedance (resistance) higher than the load. FIG. 9 illustrates the circuit of FIG. 8 with the switch 11c open, that is to say with the appliance in normal power or operation mode. A single current path I1 exits through the load when the AC input voltage Vin is positive. FIG. 11 illustrates the circuit of FIG. 9 when the appliance goes into standby mode and closes the switch 11c. Two current paths I1 through the load and I2 through resistor 10c exist. The current resistor 10c in the load connected in parallel the equivalent resistance is less enhance relatively low input power is consumed.

Thus, according to the invention a capacitor drop power supply is modified by the inclusion of a switch and one or more additional circuit components wherein the switch is operated by a control of the load, in the preferred embodiment an appliance, connected to the power supply. When the load connected to the power supply goes into a standby or lower power mode the switch is activated thereby changing the configuration of the power supply in order to reduce the power consumption of the power supply.

What is claimed is:

1. A capacitor drop power supply circuit for supplying power to a load, the power supply circuit comprising:
 a first capacitor drop circuit;
 a second capacitor drop circuit connected in parallel with the first drop circuit; and
 a switch for altering configuration of the power supply circuit to reduce input current of the power supply circuit, the switch being operable by the load to alter the configuration of the power supply circuit when the load enters a power save mode, wherein the switch is connected to the second drop circuit and has a first position in which the second drop circuit is connected to the load and a second position in which the second drop circuit is not connected to the load.

2. The capacitor drop power supply of claim 1 wherein the switch is one of a relay and a transistor.

3. The capacitor drop power supply of claim 1 further including a resistor connected in series with the switch, wherein the resistor and the switch are connected in parallel with the load.

4. The capacitor drop power supply of claim 3 wherein the resistor has an impedance that is higher than impedance of the load.

5. A capacitor drop power supply circuit for supplying power to a load, the power supply circuit comprising:
 an input for receiving an input alternating current having a first part-cycle in which current flows in a first direction and a second part-cycle in which current flows in a second direction, and
 a switch operable to alter configuration of the power supply circuit between a first configuration having a first current path through the power supply circuit in the first direction and a second configuration having a second current path through the power supply circuit in the first direction, wherein the switch is operable by the load to change the power supply circuit between the first configuration and the second configuration when the load enters a power save mode.

6. The capacitor drop power supply circuit of claim 5 wherein the switch is one of a relay and a transistor.

7. The capacitor drop power supply circuit of claim 5 comprising a first drop circuit and a second drop circuit connected in parallel with the first drop circuit, wherein the switch is connected to the second drop circuit and has
 a first position in which the second drop circuit is connected to the load, and a second position in which the second drop circuit is not connected to the load.

8. The capacitor drop power supply circuit of claim 5 wherein
the circuit comprises a pair of circuit components, and
the switch has a first position in which the circuit components are connected in series and a second position in which the circuit components are connected in parallel.

9. The capacitor drop power supply circuit of claim 8 wherein the pair of circuit components is a pair of capacitors.

10. The capacitor drop power supply circuit of claim 5 wherein the power supply circuit comprises a resistor connected in series with the switch, the resistor and switch being connected in parallel with an output of the power supply circuit.

11. The capacitor drop power supply of claim 10 wherein the resistor has an impedance that is higher than impedance of the load.

12. A capacitor drop power supply circuit for supplying power to a load, the power supply circuit comprising:
a first capacitor drop circuit:
a second capacitor drop circuit; and
a switch for altering configuration of the power supply circuit to reduce input current of the power supply circuit, the switch being operable by the load to alter the configuration of the power supply circuit when the load enters a power save mode, wherein the switch has a first position in which the first and second drop capacitor circuits are connected in series and a second position in which the first and second drop capacitor circuits are connected in parallel.

13. The capacitor drop power supply of claim 12 wherein the switch is one of a relay and a transistor.

14. The capacitor drop power supply of claim 12 further including a resistor connected in series with the switch, wherein the resistor and the switch are connected in parallel with the load.

15. The capacitor drop power supply of claim 14 wherein the resistor has an impedance that is higher than impedance of the load.

* * * * *